United States Patent [19]

Delano

[11] Patent Number: 4,866,858

[45] Date of Patent: Sep. 19, 1989

[54] PROCESS FOR FLUIDIZING

[75] Inventor: Mark A. Delano, White Plains, N.Y.

[73] Assignee: Union Carbide Corporation, Danbury, Conn.

[21] Appl. No.: 98,772

[22] Filed: Sep. 17, 1987

Related U.S. Application Data

[63] Continuation of Ser. No. 404,813, Aug. 3, 1982, abandoned.

[51] Int. Cl.$^4$ ............................................. F26B 3/10
[52] U.S. Cl. ...................................... 34/10; 34/57 A; 34/191
[58] Field of Search ................... 34/10, 57 A, 191; 110/245; 432/15, 58; 165/104.16

[56] References Cited

U.S. PATENT DOCUMENTS 3,691,644  9/1972  Schnitzer ................................. 34/10
4,071,960  2/1978  Bowles .................................... 34/191

Primary Examiner—Henry Bennett
Attorney, Agent, or Firm—Shirley L. Church; Stanley Ktorides

[57] ABSTRACT

In a process for fluidizing a bed of particles by passing a gas continuously through the bed, the improvement comprising dividing the bed into at least two sections, and introducing the gas sequentially into each section, one section at a time, the flow of gas and the sequence being at a rate sufficient to maintain the entire bed of particles in a fluidized state.

2 Claims, No Drawings

PROCESS FOR FLUIDIZING

This application is a continuation of prior U.S. application 404,813 filed 8/3/82 now abandoned.

TECHNICAL FIELD

This invention relates to a process for fluidizing a bed of particles to provide a fluidized bed for industrial applications.

BACKGROUND ART

Fluidized beds are used in a number of applications for the heating and cooling of materials. They exhibit good heat transfer characteristics and a uniform bed temperature profile, and have the capability of being quickly turned on because they are able to store heat or refrigeration. They are usually designed to utilize heat exchange panels or coils when the heating or cooling loadsignificantly exceeds the capability of the fluidizing gas flow to provide it.

A fluidized bed, in its simplest form, is a bed of particulate material supported on a distribution plate through which gas or liquid is forced at a velocity sufficient to cause the particles to separate and to act as a fluid. The primary physical characteristics affecting a fluidized bed are particle size and distribution, particle density, fluid viscosity, and fluid density. Further, the viscosity of fluidizing gases drops off rapidly with a reduction in temperature, which necessitates an increase in fluidizing flow.

One technique used for fluidizing a bed is known as pulsing, which is the cycling of the fluidizing flow of gas or liquid through "on" and "off" phases. Pulsing is found to reduce the quantity of gas or liquid required to maintain sufficient fludization in the bed to carry out the intended heat treatment or cryogenic process. Unfortunately, the present practice of on/off pulsing does not provide for a uniform flow through the heat transfer device, if one is used to heat or cool the bed, or through the bed itself. This lack of uniform flow leads to slugging in the heat exchanger and/or a failure to maintain a constant temperature and pressur in the bed, which, in turn, leads to an inability to meet process specifications and inefficiency in the utilization of the very gas or liquid, which the pulsing technique is attempting to save over its predecessor, the continuous flow.

It is clear, then, that some other arrangement for utilizing the fluidizing medium is necessary if slugging is to be avoided and constant temperatures and pressures are to be achieved without a loss in gas utilization efficiency.

DISCLOSURE OF INVENTION

An object of this invention, therefore, is to provide an improvement in a process for fluidizing a gas of particles whereby constancy of gas flow, temperature, and pressure are attained together with a reduction in the amount of gas used to maintain the bed in a fluidized state.

Other objects and advantages will become apparent hereafter.

According to the present invention, an improvement has been discovered in a process for fluidizing a bed of particles by passing a gas continuously through the bed. The improvement comprises dividing the bed into at least two sections, and introducing the gas sequentially into each section, one section at a time, the flow of gas and the sequence being at a rate sufficient to maintain the entire bed of particles in a fluidized state.

DETAILED DESCRIPTION

A process and a system for fluidizing, in this case adapted for cryogenic service, may be found in patent application Ser. No. 246,916 filed Mar. 23, 1981, now U.S. Pat. No. 4,343,634, issued Aug. 10, 1982, incorporated by reference herein.

The temperatures at which subject process can be carried out cover a broad range from as low as minus 250° F. where the bed is being operated cryogenically to as high as 2200° F. where it is used in a heat treating process. Any gas or liquid, which is inert insofar as the apparatus, process materials, and the medium to be fluidized can be used. Where cooling is required, various cryogenic fluids such as liquid nitrogen may be used, and, in the heating process, nitrogen or air are often used to provide the fluidization. The same gases and liquids can be used as heat transfer mediums in heat exchangers or to provide the necessary process temperature directly to the bed. It should be noted here that, aside from subject improvement, the fluidizing process and apparatus contemplated here are conventional. Some description of the essential features will be provided. however.

The particles used in the bed can be alumina, sand, glass, ceramic powder, metal, salt, or any relatively fine material, which is inert to the other materials used in the process and will not break up to any appreciable extent. Paticle size diameters are typically in the range of about 44 microns to about 177 microns.

A fluidized bed generally has two controlled conditions: bed temperature and fluidizing flow. While these conditions may be controlled manually, it is desirable, particularly in a cryogenic fluidized bed, to have bed temperature and fluidizing flow controlled automatically thus minimizing operator involvement.

The following is a description of a cryogenic fluidized bed system in which subject process can be carried out. Other similar systems, scaled up or down, will also be suitable, as well as systems adapted for heat treating.

The heart of the fluidized bed system is a fluidized bed containment vessel comprised of two concentric cylinders spaced by five inches of perlite insulation throughout the annulus. The internal cylinder is 44 inches deep and 48 inches in diameter. Along the inside of this cylinder are four fifty foot, $\frac{3}{4}$ inch outer diameter copper heat transfer coils connected in parallel, each of which occupies an annular region of about four inches thereby leaving a free cross-section of approximately forty inches in the bed. The gas distributor plate, having a screw type design, comprises the base of the internal cylinder and is nine inches above the base of the exterior cylinder. This nine inch high chamber comprises the plenum, which is divided into four equal quadrants, each of which is independently supplied with gas. The containment vessel is equipped with a cover and a purge system in order to prevent moisture from accumulating when the bed is not being fluidized. Liquid nitrogen is supplied from a storage tank and gaseous nitrogen is supplied from another in-house source. Both are conducted to the system through a simple pipe network. During normal operation of the system, liquid nitrogen is transferred from the storage tak through a pneumatic control valve, is mixed with ambient gaseous nitrogen, and then flows into the four heat transfer coils connected in parallel. Heat is transferred from the bed through the coils to the liquid nitrogen, which is consequently vaporized to gaseous nitrogen. The gaseous nitrogen, whih is now at about bed temperature, e.g., about minus 120° F. for metal parts, then flows out of the coils to the plenum supply line, through an orifice meter, and into the plenum to provide fluidizing flow to the bed. The liquid and gaseous nitrogen is introduced into the coils, which, as noted, are located in the bed, from a point external, but proximate, to the bed. The point is not more than about a foot away from the bed and preferably no more than about six inches away from the bed. A temperature controller senses the bed temperature and, in conjunction with a pressure transducer, opens or closes a pneumatic control valve to modulate the amount of liquid nitrogen admitted to the system. The pressure at which the flow of ambient gaseous nitrogen is triggered is controlled by pre-setting a gas regulator. A desired bed temperature, e.g., minus 120° F., is selected and the temperature controller and gas regulator are set. At the start of cooldown, the flow will be essentially liquid nitrogen. As the bed approaches minus 120° F., ambient gas is fed into the liquid nitrogen until eventually a steady state is reached where the bed temperature and coil outlet temperature are maintained at about minus 120° F. Thus, between the temperature controller and the gas regulator, the heat load of the bed and any heat leaks are compensated for. It will be understood that the mixture which passes from the coils into the plenum supply line is a mixture of vaporized liquid nitrogen and the nitrogen gas, which was initially at ambient temperature.

This positioning of two or more heat transfer coils, connected in parallel, in the bed provides sufficient heat transfer area to vaporize the cryogen as well as sufficient cross-sectional flow area for low fluid velocities within the coil. A typical coil is a coil of tubing usually wound in a circular fashion. Each circle of tubing may or may not be in contact with the other. The appearance is smaller to that of a coiled spring. While the length and diameter of the tubing, and the number of coils is determined by the size of the bed, some guidance for conventional bed sizes can be given, i.e., the length of the tubing in each coil can be in the range of about 10 to about 100 feet, the number of coils can be in the range of about 2 to about 6, and the diameter of the tube, which makes up the coil, can be in the range of about 0.25 inch to about 1.0 inch. Although the tubing used in each coil is relatively long, the coiled tube takes up a small amount of space, e.g., a space having a volume in the range of about 12 to about 300 cubic inches, and the coil diameter, in such a case, is in the range of about 6 to about 80 inches. The placement of the coils within the bed is such that all of the bed particles are brought as close to the coils as possible. Dividing the bed into quadrants with one coil for each quadrant is a preferred way of arranging the coils. While other heat transfer devices can be used instead of coiled tubing, such as plate coils, the coiled tubing is preferred. The material of choice for the tubing is copper, but other high thermal conductivity materials, such as aluminum, can be used. Typical flow rates for the liquid nitrogen, ambient gas, and mixture of ambient gas and vaporized liquid nitrogen are in the range of about 4 to about 150 standard cubic feet per minute (scfm).

As noted, the mixture of gas and vaporized liquid nitrogen is used as the fluidizing gas after it exits the coils. This gas is delivered continuously to the plenum during the course of the particular process, which is being carried out in the bed. In the particular case at hand, where the plenum is divided into quadrants, the fluidizing gas is preferably introduced into the bed in two ways. One is by sequentially emitting a pulse of gas from each quadrant of the plenum thereby limiting the flow at any given instant to only one quadrant. The rate of flow and the sequence of pules from quadrant to quadrant is sufficient to lift the entire bed to that point where no bubbles appear at the surface of the bed. For a bed of the size described above a satisfactory fluidizing flow rate is in the range of about 10 scfm to about 100 scfm and the number of sequential pulses per minute is in the range of about 1 to about 120.

The second way of introducing the fluidizing gas is by operating two diagonally opposite quadrants as a pair and sequentially emitting two simultaneous pulses of gas, each pulse from one quadrant in the pair. Thus, each pair of quadrants is alternated to maintain the entire bed in a fliuidized state.

The average mass flowrate of fluidizing gas flowing through the bed during pulsed fluidization as practiced in subject process can be determined from the following equation:

$$A = \frac{B}{C}$$

wherein:

$A$ = average mass flowrate
$B$ = instantaneous mass flowrate
$C$ = $\frac{\text{total bed area}}{\text{area fluidized during each pulse.}}$ In the case of sequential quadrant pulsing, C will be equal to 4, and in the case of the sequential pulsing of diagonally opposite pairs, C will be equal to 2.

The number of sections into which the bed can be divided in order to apply subject process ranges from 2 to the limits of practicality. While a preferred range is from 2 to 8, it is contemplated that a revolving gas injector be used to provide the fluidizing gas from the plenum to the bed. In any case, the gas should be delivered to equally sized sections of the bed and each pulse of gas should be equal in amount to the other.

Subject process is particularly suitable when the bed medium is a fine aeratable powder, which does not readily fluidize using continuous fluidization in which the gas is delivered to one point in the bed. It is also advantageous when using expensive gas which cannot be recycled through the system. Adapting a system to the described process does not, of course, preclude its being constructed so that the system is easily converted over to continuous fluidization without sequential pulsing or to the on/off type of pulsing, as each of these techniques may be useful in particular situations. Further, sequential pulsing can be used to modulate the rate of heat transfer from an object immersed in the bed, i.e., increasing the frequency of pulsations will enhance the heat transfer, and conversely, decreasing the frequency will decrease the rate of heat transfer.

It is found that the sequential pulsing of subject process not only provides, in many cases, gas savings of up to fifty percent over continuous fluidization without pulsing, and over the on/off pulsing, but also prevents pressure surges due to interruption of the fluidizing flow in the latter case and the possibility of bed collapse.

I claim:

1. A method for heating or cooling objects, comprising the steps of:
   (a) providing a fluidized bed, wherein said bed is comprised of particles which are fluidized by passing a gas through said bed, said bed comprising at least two sections into which said gas is introduced sequentially, so that said gas flow is on in at least one section and off in at least one other section for a discreet period of time in said sequence, while maintaining the entire bed of said particles in a fluidized state; and
   (b) introducing an object to be heated or cooled into said bed in a manner which provides the desired heat transfer characteristics between said object and said bed.

2. The process defined in claim 1 wherein the bed is divided into 2 to 8 sections.

* * * * *